United States Patent
Marek et al.

(10) Patent No.: US 7,468,882 B2
(45) Date of Patent: Dec. 23, 2008

(54) SOLID ELECTROLYTIC CAPACITOR ASSEMBLY

(75) Inventors: Ladislav Marek, Lanskroun (CZ); Jaroslav Tomasko, Ceska Trebova (CZ); Stanislav Zednicek, Lanskroun (CZ)

(73) Assignee: AVX Corporation, Myrtle Beach, SC (US)

(*) Notice: Subject to any disclaimer, the term of this patent is extended or adjusted under 35 U.S.C. 154(b) by 172 days.

(21) Appl. No.: 11/602,451

(22) Filed: Nov. 20, 2006

(65) Prior Publication Data
US 2007/0253147 A1    Nov. 1, 2007

Related U.S. Application Data

(60) Provisional application No. 60/795,970, filed on Apr. 28, 2006.

(51) Int. Cl.
*H01G 4/228* (2006.01)
*H01G 9/00* (2006.01)

(52) U.S. Cl. .................. 361/540; 361/541; 361/535

(58) Field of Classification Search ............ 361/523, 361/528–529, 540–541, 532–533, 535
See application file for complete search history.

(56) References Cited

U.S. PATENT DOCUMENTS

| | | | |
|---|---|---|---|
| 3,345,545 A | 10/1967 | Bourgault et al. | |
| 4,085,435 A | 4/1978 | Galvagni | |
| 4,203,194 A | 5/1980 | McGrath | |
| 4,931,901 A | 6/1990 | Heron, Jr. | |
| 4,945,452 A | 7/1990 | Sturmer et al. | |
| 5,198,968 A | 3/1993 | Galvagni | |
| 5,357,399 A | 10/1994 | Salisbury | |
| 5,377,073 A | 12/1994 | Fukaumi et al. | |
| 5,394,295 A | 2/1995 | Galvagni et al. | |
| 5,461,537 A | * 10/1995 | Kobayashi et al. | .......... 361/525 |
| 5,478,965 A | 12/1995 | Hashiba | |
| 5,495,386 A | 2/1996 | Kulkarni | |

(Continued)

FOREIGN PATENT DOCUMENTS

JP    01261814 A    * 10/1989

(Continued)

OTHER PUBLICATIONS

Poster—"Hitachi Tantalum Capacitor Development Road Map" Hitachi AIC Inc., CEATEC 2003, Japan, Oct. 7-11, 2003.

(Continued)

*Primary Examiner*—Eric Thomas
(74) *Attorney, Agent, or Firm*—Dority & Manning, P.A.

(57) ABSTRACT

An integrated capacitor assembly that offers improved performance characteristics in a convenient and space-saving package is provided. More specifically, the capacitor assembly contains a first solid electrolytic capacitor element and second solid electrolytic capacitor element positioned adjacent to the first solid electrolytic capacitor element. The first and second solid electrolytic capacitor elements each contain an anode formed from a valve metal composition having a specific charge of about 70,000 µF*V/g or more, the anode having a thickness of from about 0.1 to about 4 millimeters. A thermally conductive material is positioned between the first and second solid electrolytic capacitor elements and electrically connected thereto. The thermally conductive material has a coefficient of thermal conductivity of about 100 W/m-K or more at a temperature of 20° C. A case encapsulates the first and second solid electrolytic capacitor elements.

40 Claims, 5 Drawing Sheets

U.S. PATENT DOCUMENTS

| | | |
|---|---|---|
| 5,638,253 A | 6/1997 | Hasegawa |
| 5,949,639 A | 9/1999 | Maeda et al. |
| 6,191,936 B1 | 2/2001 | Webber et al. |
| 6,197,252 B1 | 3/2001 | Bishop et al. |
| 6,238,444 B1 | 5/2001 | Cadwallader |
| 6,243,605 B1 | 6/2001 | Youker et al. |
| 6,322,912 B1 | 11/2001 | Fife |
| 6,343,004 B1 | 1/2002 | Kuranuki et al. |
| 6,392,869 B2 | 5/2002 | Shiraishi et al. |
| 6,400,556 B1 | 6/2002 | Masuda et al. |
| 6,535,375 B1 | 3/2003 | Jung et al. |
| 6,560,090 B2 | 5/2003 | Uenishi et al. |
| 6,563,693 B2 | 5/2003 | Nakada et al. |
| 6,674,635 B1 | 1/2004 | Fife et al. |
| 6,689,187 B2 * | 2/2004 | Oda ............................ 75/255 |
| 6,751,833 B2 | 6/2004 | Saito et al. |
| 6,757,152 B2 | 6/2004 | Galvagni et al. |
| 6,816,358 B2 | 11/2004 | Kida et al. |
| 6,819,546 B2 | 11/2004 | Kuriyama |
| 6,912,117 B2 | 6/2005 | Arai et al. |
| 6,970,344 B2 | 11/2005 | Arai et al. |
| 6,985,353 B2 | 1/2006 | Hirota et al. |
| 7,116,548 B2 | 10/2006 | Satterfield, Jr. |
| 7,138,713 B2 | 11/2006 | Kida et al. |
| 7,161,797 B2 | 1/2007 | Vaisman et al. |
| 7,190,571 B2 | 3/2007 | Heusmann et al. |
| 7,218,505 B2 | 5/2007 | Naito et al. |
| 7,221,555 B2 | 5/2007 | Goldberger |
| 2008/0106852 A1 * | 5/2008 | Amita et al. ................ 361/528 |

FOREIGN PATENT DOCUMENTS

| | | |
|---|---|---|
| JP | 5055091 | 3/1993 |
| JP | 1128845 | 10/1999 |

OTHER PUBLICATIONS

Great Britain Search Report for GB0705649.2, 1 page, May 15, 2007.
Abstract of Japanese Patent No. JP2001284192, Oct. 12, 2001.
Abstract of Japanese Patent No. JP2002075807, Mar. 15, 2002.
Abstract of Japanese Patent No. JP2002164760, Jun. 7, 2002.
Abstract of Japanese Patent No. JP2003267404, Sep. 25, 2003.
Abstract of Japanese Patent No. JP10144573, May 29, 1998.
Abstract of Japanese Patent No. JP11274008, Oct. 8, 1999.
Abstract of Japanese Patent No. JP3145115, Jun. 20, 1991.
Abstract of Japanese Patent No. JP4236415, Aug. 25, 1992.
Abstract of Japanese Patent No. JP5234829, Sep. 10, 1993.
Abstract of Japanese Patent No. JP6168854, Jun. 14, 1994.
Abstract of Japanese Patent No. JP6232012, Aug. 19, 1994.
Abstract of Japanese Patent No. JP6283391, Oct. 7, 1994.
Abstract of Japanese Patent No. JP7183167, Jul. 21, 1995.
Abstract of Japanese Patent No. JP7183170, Jul. 21, 1995.
Abstract of Japanese Patent No. JP7240351, Sep. 12, 1995.
Abstract of Japanese Patent No. JP8115855, May 7, 1996.
Article—*Lowest ESR at High Voltage—Multianode Tantalum Capacitors*, Horacek et al., CARTS 2004 and Advancing Microelectronics, Jul./Aug. 2006, pp. 26-28.
Article—*Low ESR and Low Profile Technology on Niobium Oxide*, Zedníček et al.,CARTS 2004, CONF 24, pp. 223-231.
Product Information—NBM Multianodes OxiCap™ Ultra Low ESR Capacitor COTS-Plus from AVX Corporation, 2 pages.

* cited by examiner

SOLID ELECTROLYTIC CAPACITOR ASSEMBLY

CROSS REFERENCE TO RELATED APPLICATIONS

The present application claims filing benefit of U.S. provisional patent application Ser. No. 60/795,970 filed on Apr. 28, 2006, which is hereby incorporated by reference in its entirety.

BACKGROUND OF THE INVENTION

The diversity of modern technical applications creates a need for efficient electronic components and integrated circuits for use therein. Capacitors are a fundamental component used for filtering, decoupling, bypassing and other aspects of such modern applications which may include wireless communications, high-speed processing, networking, circuit switching and many other applications. A dramatic increase in the speed and packing density of integrated circuits requires advancements in decoupling capacitor element technology. When high-capacitance decoupling capacitors are subjected to the high frequencies of many present applications, performance characteristics become increasingly more important. Because capacitors are fundamental to such a wide variety of applications, their precision and efficiency is imperative. Many specific aspects of capacitor design have thus been a focus for improving the performance characteristics of capacitors. Solid electrolytic capacitors (e.g., tantalum capacitors) have been a major contributor to the miniaturization of electronic circuits and have made possible the application of such circuits in extreme environments. Tantalum capacitors, for example, are typically made by compressing tantalum powder into a pellet, sintering the pellet to form a porous body, and then subjecting it to anodization to form a continuous dielectric oxide film on the sintered body. The capacitance of the tantalum anode is a direct function of the specific surface area of the sintered powder. To increase capacitance, greater specific surface area may thus be achieved through the use of finer tantalum particles. Unfortunately, "necks" are often formed between fine particles during sintering. During use, these necks tend to overheat when a current passes through the anode, thereby causing damage to the capacitor.

As such, a need currently exists for a capacitor that is able to satisfy industry requirements regarding size and performance, yet still able to avoid overheating during use due to insufficient power dissipation.

SUMMARY OF THE INVENTION

In accordance with one embodiment of the present invention, a capacitor assembly is disclosed that comprises a first solid electrolytic capacitor element and a second solid electrolytic capacitor element positioned adjacent to the first solid electrolytic capacitor element. The first and second solid electrolytic capacitor elements each contain an anode formed from a valve metal composition (e.g., tantalum or niobium oxide) having a specific charge of about 70,000 µF*V/g or more. A thermally conductive material (e.g., metal) is positioned between the first and second solid electrolytic capacitor elements, wherein the thermally conductive material has a coefficient of thermal conductivity of about 100 W/m-K or more at a temperature of 20° C. A case encapsulates the first and second solid electrolytic capacitor elements.

In accordance with another embodiment of the present invention, a capacitor assembly is disclosed that comprises a first solid electrolytic capacitor element and a second solid electrolytic capacitor element positioned adjacent to the first solid electrolytic capacitor element. The first and second solid electrolytic capacitor elements each contain an anode formed from a valve metal composition. The anode has a thickness of from about 0.1 to about 4 millimeters. The first solid electrolytic capacitor element has a first anode lead and the second solid electrolytic capacitor element has a second anode lead, wherein the first anode lead is substantially parallel to and in substantial horizontal alignment with the second anode lead. The assembly also comprises an anode termination containing a portion having an upper region and a lower region, the upper region being electrically connected to the first anode lead and the lower region being electrically connected to the second anode lead. A cathode termination is positioned between the first and second solid electrolytic capacitor elements and electrically connected thereto, wherein the cathode termination contains a thermally conductive material. A case encapsulates the first and second solid electrolytic capacitor elements, wherein the case leaves exposed portions of the anode and cathode terminations.

In accordance with still another embodiment of the present invention, a method of forming a capacitor assembly is disclosed. The method comprises providing a first solid electrolytic capacitor element and a second solid electrolytic capacitor element, the first and second solid electrolytic capacitor elements containing respective first and second anode leads extending from an anode, wherein the anode is formed from a valve metal composition. A lead frame is also provided that has a first surface and an opposing second surface, wherein the lead frame defines a cathode termination and an anode termination, and further wherein the lead frame contains a thermally conductive material. The first solid electrolytic capacitor element is electrically connected to the first surface of the cathode termination, and the first anode lead is welded to the anode termination. The second solid electrolytic capacitor element is electrically connected to the second surface of the cathode termination, and the second anode lead is welded to the anode termination.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an integrated capacitor assembly that offers improved performance characteristics in a convenient and space-saving package. The capacitor assembly contains at least two solid electrolytic capacitor elements that are positioned adjacent to each other (e.g., stacked). Each capacitor element contains an anode formed from a valve metal composition. The valve metal composition may have a high specific charge, such as about 70,000 microFaradays*Volts per gram ("μF*V/g") or more, in some embodiments about 80,000 μF*V/g or more, in some embodiments about 100,000 μF*V/g or more, and in some embodiments, about 120,000 μF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the anode may be formed from a valve metal oxide having an atomic ratio of metal to oxygen of 1: less than 25, in some embodiments 1: less than 2.0, in some embodiments 1: less than 1.5, and in some embodiments, 1:1. Examples of such valve metal oxides may include niobium oxide (e.g., NbO), tantalum oxide, etc., and are described in more detail in U.S. Pat. No. 6,322,912 to Fife, which is incorporated herein in its entirety by reference thereto for all purposes.

A variety of conventional fabricating procedures may generally be utilized to form the anode. In one embodiment, a tantalum or niobium oxide powder having a certain particle size is first selected. The particle size may vary depending on the desired voltage of the resulting capacitor element. For example, powders with a relatively large particle size (e.g., about 10 micrometers) are often used to produce high voltage capacitor elements, while powders with a relatively small particle size (e.g., about 0.5 micrometers) are often used to produce low voltage capacitor elements. The particles are then optionally mixed with a binder and/or lubricant to ensure that the particles adequately adhere to each other when pressed to form the anode. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water; acetone; methyl isobutyl ketone; trichloromethane; fluorinated hydrocarbons (freon) (DuPont); alcohols; and chlorinated hydrocarbons (carbon tetrachloride). When utilized, the percentage of binders and/or lubricants may vary from about 0.1% to about 8% by weight of the total mass. It should be understood, however, that binders and lubricants are not required in the present invention. Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode subsequent to pressing and/or sintering of the anode.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Regardless of the particular manner in which it is form, the thickness of the anode is selected in accordance with the present invention to improve the electrical performance of the capacitor assembly. For example, the thickness of the anode (in the -z direction in FIG. 1) of each individual capacitor element typically ranges from about 0.1 to about 4 millimeters, in some embodiments, from about 0.2 to about 3 millimeters, and in some embodiments, from about 0.4 to about 1 millimeter. Such a relatively small anode thickness (i.e., "low profile") helps dissipate heat generated by the high specific charge powder and also provide a shorter transmission path to minimize ESR and inductance. Furthermore, although the combined anode thickness of the capacitor elements may be equivalent to the anode thickness of a conventional single capacitor, the use of a small anode thickness for each individual capacitor element allows for improved impregnation of the dielectric and solid electrolyte, thereby resulting in enhanced electrical performance.

The shape of the anode may also be selected to improve the electrical properties of the resulting capacitor assembly. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

The anode may be anodized so that a dielectric film is formed over and within the porous anode. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. The anode may be dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric quality is formed over the surface of the tantalum pellet. The anodization voltage typically ranges from about 5 to about 200 volts, and in some embodiments, from about 20 to about 100 volts. In addition to being formed on the surface of the anode, a portion of the dielectric oxide film will also typically form on the surfaces of the pores. It should be understood that the dielectric film may be formed from other types of materials and using different techniques.

Once the dielectric film is formed, a protective coating may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming cathodes according to conventional techniques. For instance, a solid electrolytic cathode may be formed that overlies the dielectric film. The cathode may be formed by pyrolytic decomposition of manganous nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the cathode of the solid electrolytic capacitor element. The conductive polymer coating may contain one or more conductive polymers, such as polypyrroles; polythiophenes, such as poly(3,4-ethylenedioxy thiophene) (PEDT); polyanilines; polyacetylenes; poly-p-phenylenes; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy thiophene), may initially be mixed with a polymerization catalyst to form a dispersion. For example, one suitable polymerization catalyst is BAYTRON C, which is iron III toluenesulphonate and n-butanol and sold by Bayer Corporation. BAYTRON C is a commercially available catalyst for BAYTRON M, which is 3,4-ethylene dioxythiophene, a PEDT monomer also sold by Bayer Corporation. In most embodiments, once applied, the conductive polymer is healed. Healing may occur after each application of a conductive polymer layer or may occur after the application of the entire conductive polymer coating. Although various methods have been described above, it should be understood that any other method for applying the cathode layer may also be utilized in the present invention.

Once the solid electrolytic layer is formed, the part may then be applied with a carbon coating (e.g., graphite) and silver coating, respectively. The silver coating may act as a solderable conductor and/or charge collector for the capacitor element and the carbon coating limits contact of the silver coating with the solid electrolyte. Lead electrodes may then be provided as is well known in the art. The overall thickness of each individual capacitor element may range from about 0.1 to about 4 millimeters, in some embodiments, from about 0.2 to about 3 millimeters, and in some embodiments, from about 0.4 to about 1 millimeter.

Any number of solid electrolytic capacitor elements may be employed in the present invention, such as from 2 to 8 capacitor elements (e.g., 2, 3, or 4), and in one particular embodiment, 2 capacitor elements. Regardless of the number employed, a thermally conductive material is disposed between at least two of the capacitor elements to further dissipate heat generated by the high specific charge anodes. This allows the capacitor assembly to handle higher currents that would normally cause overheating. Generally speaking, the thermally conductive material has a coefficient of thermal conductivity of about 100 Watts per meter-Kelvin (W/m-K) or more, and in some embodiments, from about 150 to about 500 W/m-K, and in some embodiments, from about 200 to about 400 W/m-K, measured at a temperature of 20° C. Any thermally conductive material may be employed, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the thermally conductive material is generally selected to optimize both heat dissipation and volumetric efficiency. For instance, the thickness of the thermally conductive material may range from about 0.01 to about 1 millimeter, in some embodiments from about 0.05 to about 0.5 millimeters, and from about 0.1 to about 0.2 millimeters. One exemplary thermally conductive material is a copper-iron alloy metal plate available from Batten & Allen (United Kingdom).

The properties of the solid electrolytic capacitor element may be controlled to optimize the performance of the resulting capacitor assembly. For instance, the solid electrolytic capacitor element may exhibit a low equivalent series resistance (ESR), which refers to the extent that the capacitor element has resistance in series with capacitance, which delays charging and discharging and causes losses in electronic circuit. For example, the solid electrolytic capacitor element may have an ESR of less than about 1 ohm, in some embodiments less than about 300 milliohms, in some embodiments less than about 200 milliohms, and in some embodiments, less than about 100 milliohms, measured with a 2-volt bias and 1-volt signal at a frequency of 100 kHz. Likewise, equivalent series inductance ("ESL") values may be less than about 10 nanoHenries ("nH"), and in some embodiments, less than about 1.5 nH, measured with a 2-volt bias and 1-volt signal at a frequency of 100 kHz. The capacitance of the solid electrolytic capacitor element may also range from about 1 to about 5,000 microFarads, in some embodiments, from about 250 to about 2,500 microFarads, in some embodiments, from about 400 to about 1,000 microFarads, measured at a frequency of 120 Hz.

In addition to the solid electrolytic capacitor elements themselves, the capacitor assembly also contains an anode termination to which the anode leads of the capacitor elements are electrically connected. Typically, the anode leads are substantially parallel to each other and face the same side. In this manner, the anode leads are placed in a close adjacent relationship, which may improve the efficiency by which the leads may be connected to the anode termination. The anode leads may also be positioned in substantial horizontal alignment (i.e., in the -x direction), which enhances the dimensional stability of the capacitor assembly. This may be accomplished, for instance, by connecting one anode lead to an upper region of the anode termination and another anode lead to a lower region of the anode termination. The capacitor assembly also contains a cathode termination to which the cathode of the solid electrolytic capacitor elements is electrically connected. In one embodiment, for example, the cathode termination is positioned between the capacitor elements so that it simultaneously functions as the thermally conductive material. The capacitor assembly also contains a case that encapsulates the individual elements, but nevertheless leaves respective portions of the terminations exposed to form a mounting surface for circuit applications.

Figure 1:
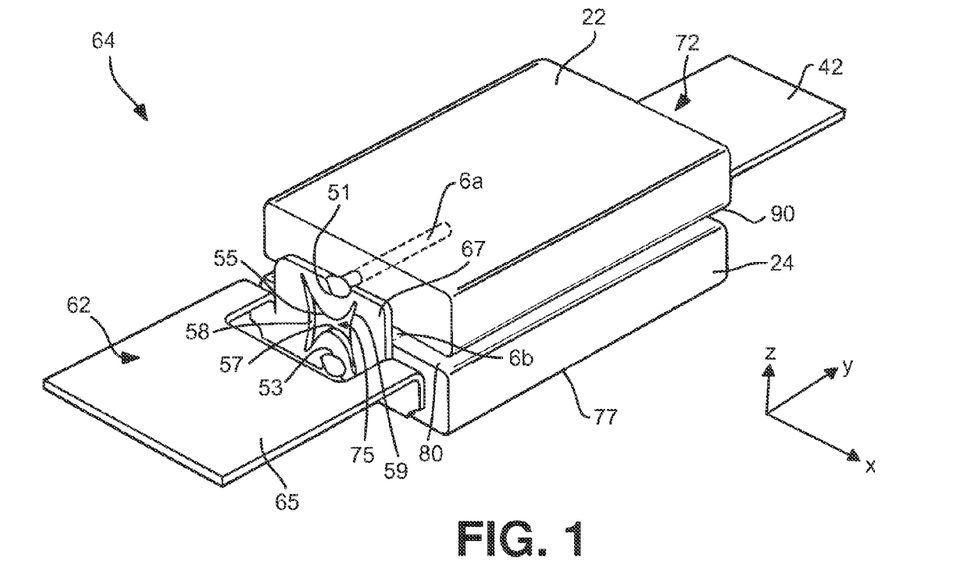
FIG. 1 is a perspective view of one embodiment of a capacitor assembly of the present invention.

Referring to FIG. 1, one particular embodiment of a capacitor assembly 64 of the present invention is shown and will now be described in more detail. The capacitor assembly 64 includes a first solid electrolytic capacitor element 22 in electrical communication with a second solid electrolytic capacitor element 24. In this embodiment, the solid electrolytic capacitor elements have a generally rectangular prismatic shape and are stacked so that the surfaces having the largest areas are positioned adjacent to each other to optimize the volumetric efficiency of the assembly 64. That is, a surface 90 of the solid electrolytic capacitor element 22 defined by its width (-x direction) and length (-y direction) is placed adjacent to a corresponding surface 80 of the solid electrolytic capacitor element 24. The capacitor elements 22 and 24 may be stacked in a vertical configuration, wherein the surface 90 is provided in a plane that is substantially perpendicular to the -x and/or -y directions, as well as in a horizontal configuration, wherein the surface 90 is provided in a plane that is substantially perpendicular to the -z direction. In the embodiment depicted, for example, the capacitor elements 22 and 24 are horizontally stacked in a plane perpendicular to the -z direction. It should be understood that the capacitor elements 22 and 24 need not extend in the same direction. For example, the surface 90 of the capacitor element 22 may be provided in a plane that is substantially perpendicular to the -x direction, while the surface 80 of the capacitor element 24 is provided in a plane that is substantially perpendicular to the -y direction. Desirably, however, both capacitor elements 22 and 24 extend in substantially the same direction.

The solid electrolytic capacitor elements 22 and 24 are connected in parallel to common electrical terminations to form the capacitor assembly 64. For example, the capacitor assembly 64 contains a cathode termination 72 that is electrically connected to the cathode of the solid electrolytic capacitor elements 22 and 24. In this particular embodiment, the cathode termination 72 is positioned between the capacitor elements 22 and 24 and is initially provided in a plane that is generally parallel to the bottom surface 77 of the capacitor assembly 64. As discussed in more detail below, however, the cathode termination 72 contains an exposed portion 42 that may be subsequently bent to form a mounting terminal. Thus, although the portion of the cathode termination 72 positioned between the capacitor elements 22 and 24 will generally remain parallel to the bottom surface 77, the exposed portion 42 may be positioned at any of a variety of angles relative (e.g., perpendicular) to the surface 77 in the final capacitor assembly 64 based on the manner in which it is bent.

When formed from a thermally conductive material, the cathode termination 72 may also function as the above-described thermally conductive material for dissipating heat generated during use. For example, the cathode termination 72 may be formed from copper or a copper alloy that is thermally conductive. If desired, the surface of the cathode termination 72 may be electroplated with nickel, silver, gold, tin, etc. as is known in the art to ensure that the final part is mountable to the circuit board. In one particular embodiment, both surfaces of the cathode termination 72 are plated with nickel and silver flashes, respectively, while the mounting surface is plated with a tin solder layer. It should be understood, however, that the cathode termination need not function as the thermally conductive material, and that such components may be separate. For example, the thermally conductive material may be electrically connected to the cathode termination (e.g., laser welded, conductive adhesive, etc.), either directly or via an additional conductive element (e.g., metal).

The capacitor assembly 64 also includes an anode termination 62 that is formed from a first portion 65 and a second portion 67. As shown in FIG. 1, the first portion 65 is integral with the second portion 67. It should be understood, however, that these portions 65 and 67 may alternatively be separate pieces that are connected together, either directly or via an additional conductive element (e.g., metal). In the illustrated embodiment, the first portion 65 is initially provided in a plane that is substantially parallel to the bottom surface 77 of the capacitor assembly 64. As discussed in more detail below, however, the first portion 65 may be subsequently bent to form a mounting terminal. Thus, the first portion 65 may be positioned at any of a variety of angles relative (e.g., perpendicular) to the surface 77 in the final capacitor assembly 64 based on the manner in which it is bent.

The second portion 67 of the anode termination 62 is provided in a plane that is generally perpendicular to the bottom surface 77 of the capacitor assembly 64. The second portion 67 possesses an upper region 51 that is electrically connected to the anode lead 6a and a lower region 53 that is electrically connected to the anode lead 6b. As shown, the second portion 67 holds the anode leads 6a and 6b in substantial horizontal alignment (i.e., in the -x direction) to further enhance the dimensional stability of the capacitor assembly 64. The regions 51 and 53 may also have a "U-shape" for further enhancing surface contact and mechanical stability of the leads 6a and 6b. The second portion 67 also contains an upper arcuate surface 55 and a lower arcuate surface 57 positioned adjacent to respective upper and lower regions 51 and 53. An opening 75 is defined between the arcuate surfaces 55 and 57 that facilitates the handling of the anode termination 62 while connecting it to the capacitor elements 22 and 24. Although not required, the second portion 67 also includes two additional opposing arcuate surfaces 58 and 59, which may further enhance the strength of the second portion 67. When configured in the manner described above, the anode termination 62 may be readily connected to the solid electrolytic capacitor elements 22 and 24 in an efficient, yet effective manner.

Figure 2:
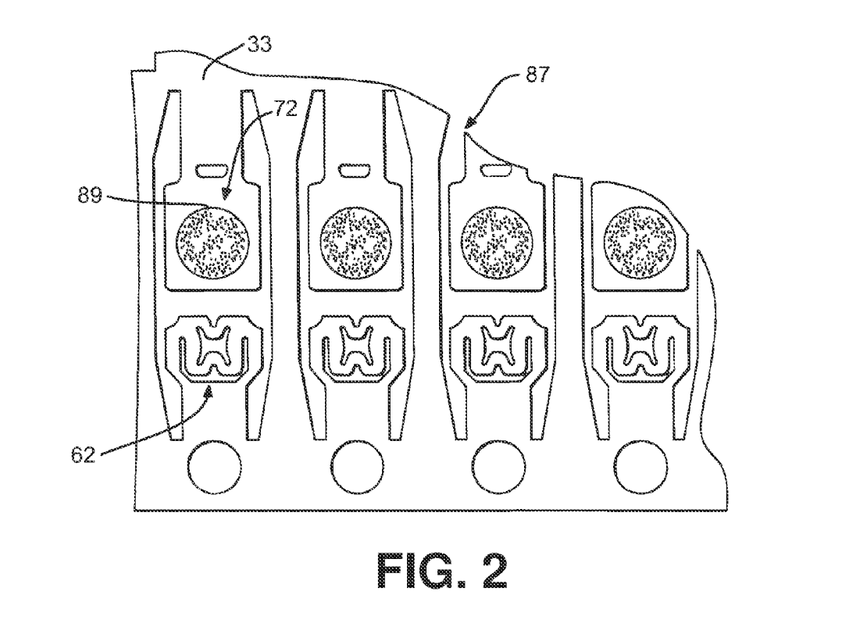
FIG. 2 is a cut-away, top view of one embodiment of a lead frame for use in the present invention.
Figure 3:
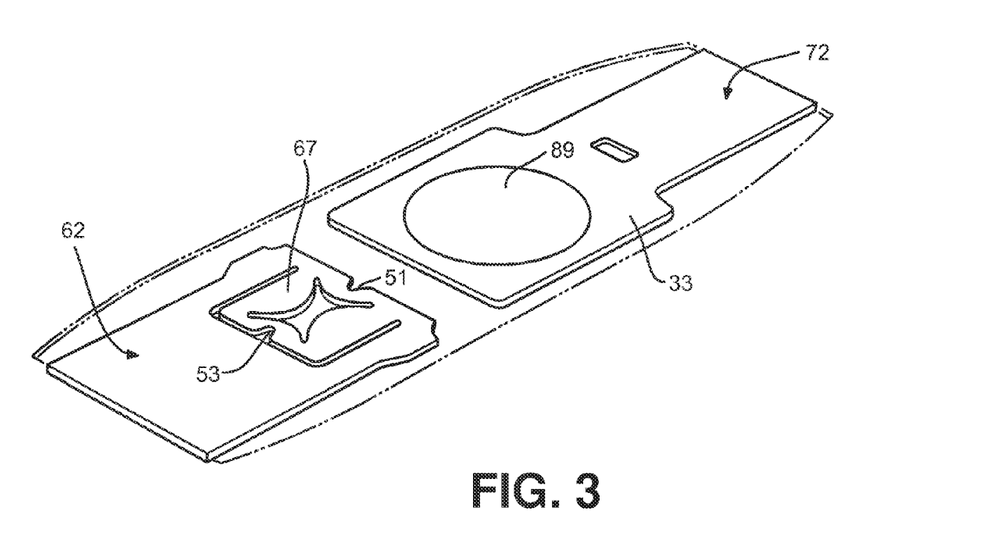
FIG. 3 is a perspective view of one embodiment of a portion of a lead frame for use in the present invention.

One embodiment of a technique for forming the capacitor assembly 64 shown in FIGS. 2-7 will now be described in more detail. In this regard, FIG. 2 illustrates a lead frame 87 that may be utilized to form multiple capacitor assemblies in accordance with the present invention. When multiple capacitor element assemblies are manufactured in bulk, the lead frame 87 may be cut into individual assemblies (as shown in FIG. 3) after the capacitor elements are attached to the frame 87. An exemplary manner in which such capacitor elements are attached to the lead frame 87 will be described for sake of simplicity with reference to a single capacitor assembly.

Initially, a conductive adhesive 89 is applied to a surface 33 of the cathode termination 72. The conductive adhesive 89 may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). One particularly suitable adhesive is a silver-loaded epoxy resin available from Emerson and Cuming under the name "Amicon CE 3513." Other suitable conductive adhesives are described in U.S. Patent Application Publication No. 2006/0038304 to Osako. et al., which is incorporated herein in its entirety by reference thereto for all purposes. Any of a variety of techniques may be used to apply the conductive adhesive 89 to the cathode termination 72. Printing techniques, for instance, may be employed due to their practical and cost-saving benefits.

Figure 4:
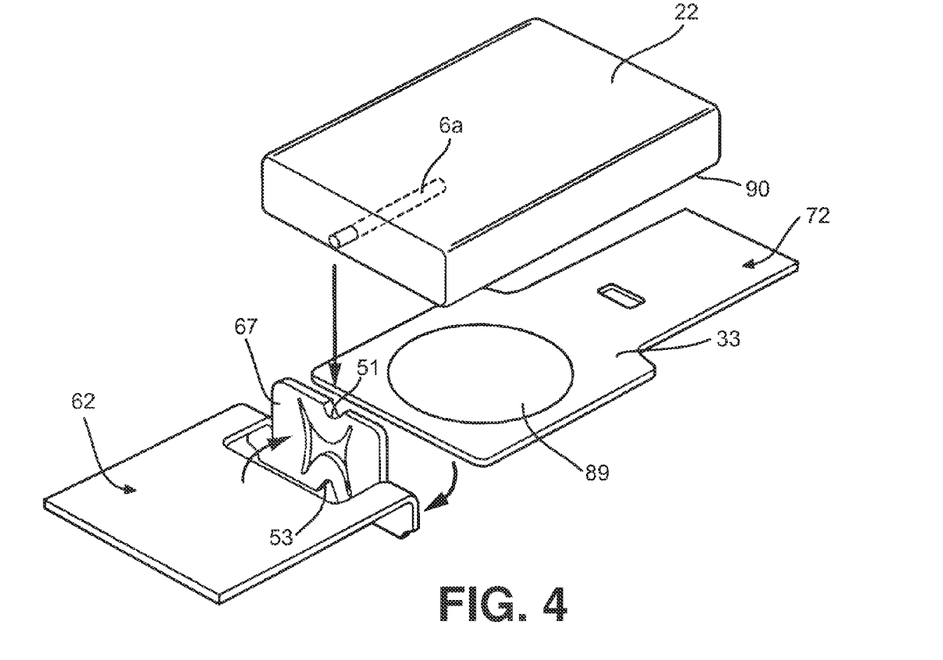
FIG. 4 is a perspective view of one embodiment for mounting a first solid electrolytic capacitor onto the lead frame shown in FIG. 3.
Figure 5:
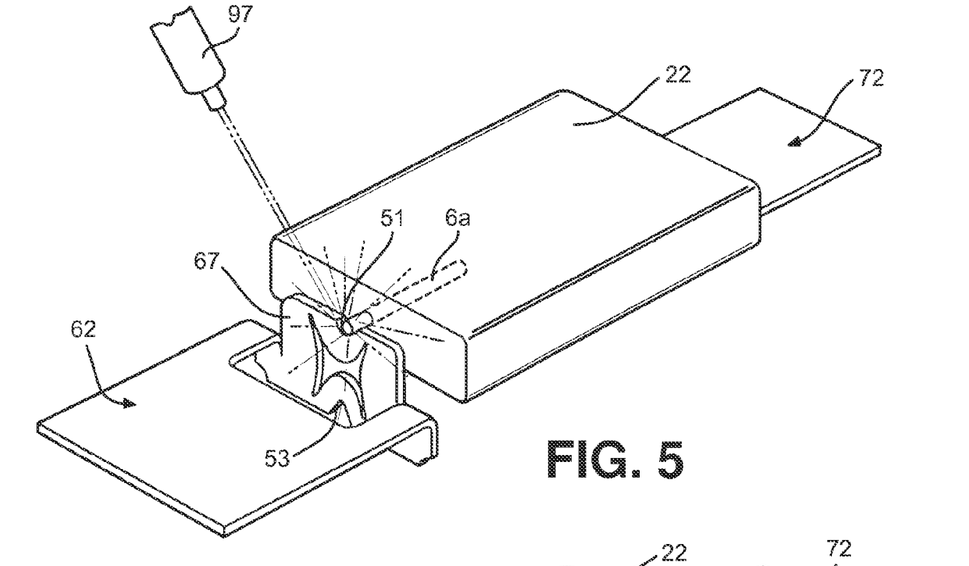
FIG. 5 is a perspective view of one embodiment for laser welding the first solid electrolytic capacitor shown in FIG. 4 to the lead frame.

As indicated by the directional arrows shown in FIG. 4, the second portion 67 of the anode termination 62 is bent upward so that the portion 67 is positioned substantially perpendicular to the surface 90 of the capacitor element 22. Thereafter, the capacitor element 22 is positioned on the surface 33 of the cathode termination 72 so that its bottom surface 90 contacts the adhesive 89 and the anode lead 6a is received by the upper U-shaped region 51. The anode lead 6a is then electrically connected to the upper region 51 using any technique known in the art, such as mechanical welding, laser welding, conductive adhesives, etc. For example, as shown in FIG. 5, the anode lead 6a may be welded to the upper region 51 using a laser 97. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 6a to the anode termination 62, the conductive adhesive 89 may then be cured. For example, a heat press may be used to apply heat and pressure to ensure that the capacitor element 22 is adequately adhered to the cathode termination 72 by the adhesive 89. The temperature and time at which heating occurs is generally based on the curing temperature of the adhesive (e.g., about 195° C. for 10 seconds for an Amicon CE 3513 adhesive).

Figure 6:
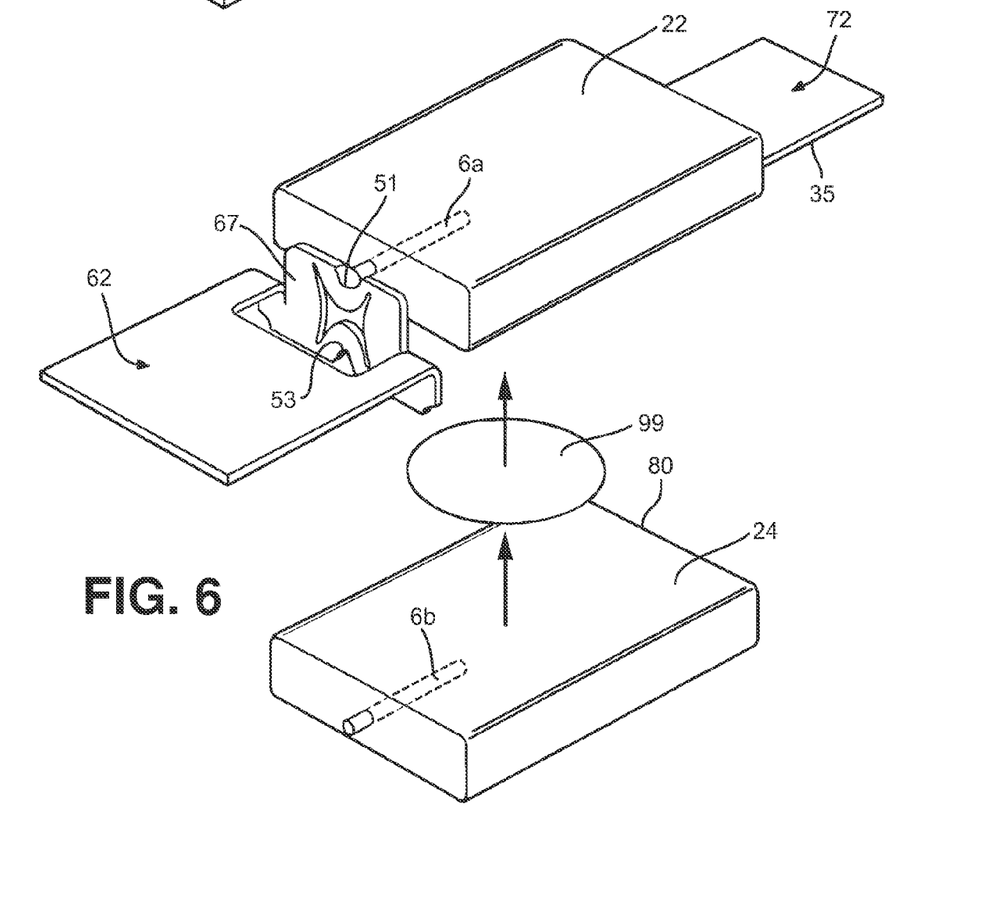
FIG. 6 is a perspective view of one embodiment for mounting a second solid electrolytic capacitor onto the lead frame shown in FIG. 3.
Figure 7:
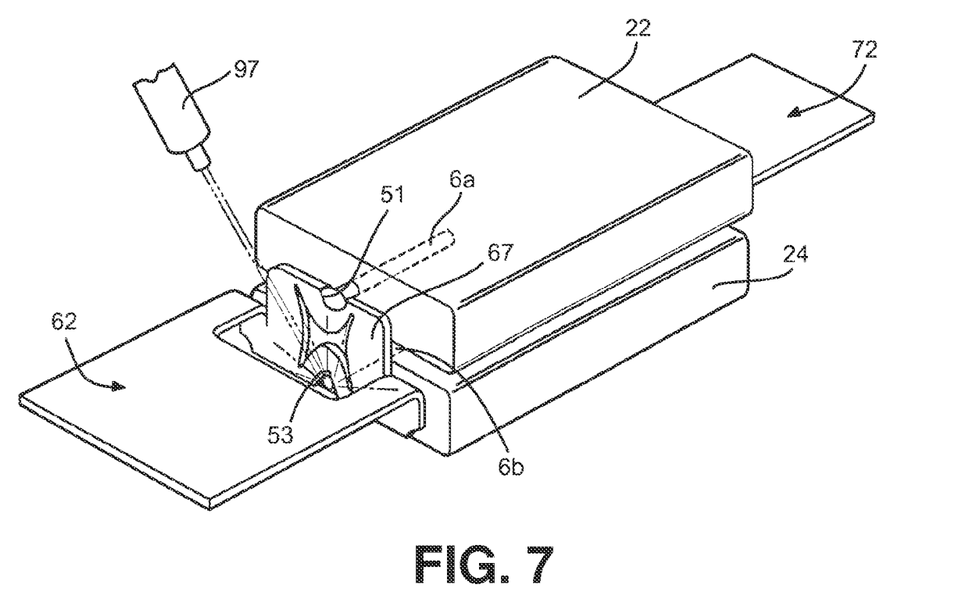
FIG. 7 is a perspective view of one embodiment for laser welding the second solid electrolytic capacitor shown in FIG. 6 to the lead frame.

Referring to FIG. 6, a conductive adhesive 99 is then applied to an opposing surface 35 of the cathode termination 72. Subsequently, the second capacitor element 24 is positioned adjacent to the surface 35 of the cathode termination 72 so that its top surface 80 contacts the adhesive 99 and the anode lead 6b is received by the lower U-shaped region 53. The anode lead 6b is then electrically connected to the lower region 53, such as with the laser welder 97 shown in FIG. 7. If desired, the laser welder 97 may also be positioned on the other side of the capacitor assembly 64 during welding to reduce the extent of interference with the other components of the assembly. As described above, a heat press may be used to apply heat and pressure to ensure that the capacitor element 24 is adequately adhered to the cathode termination 72 by the adhesive 99. It should also be understood, however, that the adhesives 89 and 99 may be cured simultaneously so that separate heat pressing steps are not required.

Figure 8:
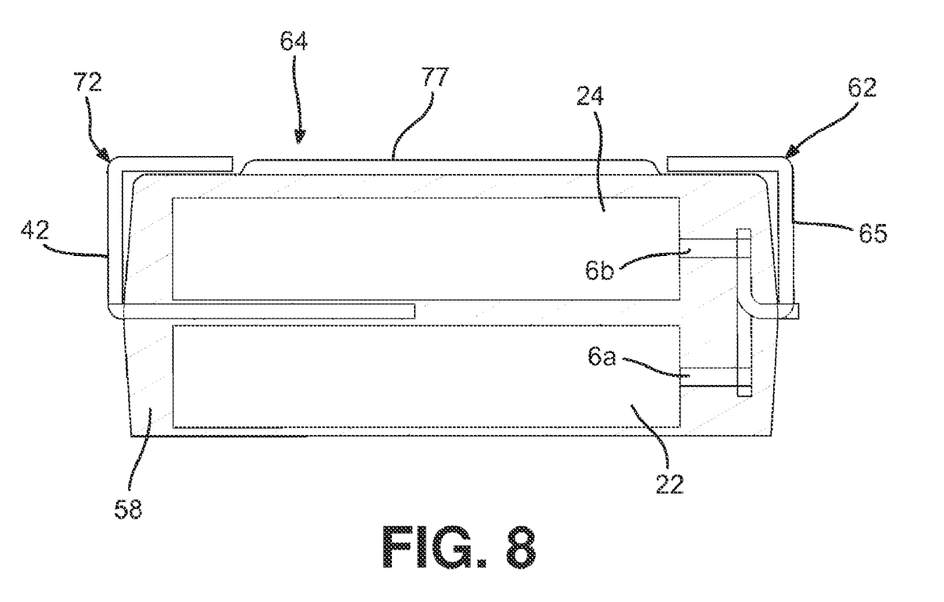
FIG. 8 is a perspective view of the capacitor assembly of FIG. 1, illustrated with an encapsulating case.

Once the capacitor elements are attached, the lead frame is enclosed within a resin casing, such as a "V case", "D" case, or "Y" case (AVX Corporation), which may then be filled with silica or any other known encapsulating material. One embodiment of such an encapsulating case is shown in FIG. 8 as element 58. The encapsulating case 58 provides additional structural and thermal protection for the capacitor assembly 64. After encapsulation, exposed portions 65 and 42 of the respective anode and cathode terminations 62 and 72 are trimmed and bent along the outside of the casing 58 (e.g., at an approximately 90° angle). In this manner, the portions 65 and 42 form J-shaped leads for the finished capacitor assembly 64, although any other known configuration may also be formed in accordance with the present invention. The resulting capacitor assembly 64 contains a surface 77 that may be mounted onto the desired surface.

As a result of the present invention, a capacitor assembly may be formed that exhibits excellent electrical properties. For example, due to the ability of the capacitor assembly of the present invention to dissipate heat, relatively high peak surge and ripple currents may be achieved. For example, the peak surge current may be about 12.0 Amps or more, in some embodiments, about 13.0 Amps or more, and in some embodiments, from about 14.0 to about 30.0 Amps. Likewise, the maximum ripple current (i.e., current required to raise the temperature of the capacitor assembly 10° C. at a frequency of 100 kHz) may be about 2.5 Amps or more, in some embodiments, about 3.0 Amps or more, and in some embodiments, about 3.5 Amps or more. The equivalent series resistance of the capacitor assembly may also be less than about 60 milliohms, in some embodiments less than about 50 milliohms, and in some embodiments, less than about 35 milliohms, measured with a 2-volt bias and 1-volt signal at a frequency of 100 kHz. It is also believed that the dissipation factor (DF) of the capacitor assembly may also be maintained at relatively low levels. The dissipation factor (DF) generally refers to losses that occur in the capacitor assembly and is usually expressed as a percentage of the ideal performance. For example, the dissipation factor of a capacitor assembly of the present invention is typically less than about 15%, and in some embodiments, less than about 5%, measured at a frequency of 120 Hz. Likewise, the capacitance of the assembly may range from about 100 to about 5,000 μF, in some embodiments from about 150 to about 1,500 µF, and in some embodiments, from about 200 to about 800 µF, measured at a frequency of 120 Hz.

The present invention may be better understood by reference to the following examples.

Test Procedures

Equivalent Series Resistance (ESR), Capacitance, and Dissipation Factor

Equivalence series resistance was measured using an Agilent 4284A Precision LCR meter with Agilent 16089B Kelvin Leads with 2 volts bias and 1 volt signal. The operating frequency was 100 kHz. The percentage of the wet to dry capacitance was also determined. The "dry capacitance" is the capacitance after application of the graphite and silver layers, while the "wet capacitance" is the capacitance after formation of the dielectric layer, measured in a liquid electrolyte. The percentage of wet to dry capacitance is determined by dividing the wet capacitance by the dry capacitance, subtracting "1", and then multiplying by "100."

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

Breakdown Voltage:

The breakdown Voltage value for a capacitor was determined by increasing the applied voltage in increments of 0.5 Volts at a constant current. The voltage at which the capacitor was destroyed was recorded as the breakdown voltage.

Peak Surge Current:

To determine peak surge current, a measured capacitor was pre-charged through a 5-kohm resistor at the rated voltage for 45 seconds and discharged. An electrolytic capacitor, charged previously to 1.1× the rated voltage, was then discharged through a 0.33-ohm resistor to the measured capacitor. Current in the circuit reached its peak or maximum value after only a few microseconds and then decreased with the RC constant of the circuit. The maximum current was monitored by a "PLUT" tester (Placepower UK, Ltd.).

Ripple current:

Ripple current was the current required to raise the temperature of the capacitor assembly by 10° C. at a frequency of 100 kHz. The current was measured using a Fluke Scopemeter® 99B (Fluke Corporation), and the temperature of the capacitor by Inframetrics ThermaCam™ PM250 (Flir Systems of Boston, Mass.).

EXAMPLE 1

Capacitor assemblies were constructed from two tantalum capacitor elements as described above and shown in FIGS. 1-8. The tantalum powder used to form each capacitor element had a specific charge of 150,000 µF*V/g (available from H.C. Starck). The tantalum powder was pressed using known techniques so that the resulting pellets had a length of about 5.35 millimeters, a width of 3.7 millimeters, and a thickness of 0.75 millimeters. The pellets were sintered at 1245° C. for 10 minutes. The pellets were anodized at a voltage of 15 volts, impregnated with manganese dioxide, and then coated with graphite and silver layers in the manner described above. Each individual tantalum part had a capacitance of about 500 µF. The parts were then connected in parallel to common anode and cathode terminations as described above so that the final capacitance of the assembly was about 1000 µF and the rated voltage was 4 Volts. The capacitor assemblies were encapsulated in a case having a length of about 7.5 mm, a width of about 4.5 mm, and a height of about 3.1 mm ("D" case, AVX Corp.).

COMPARATIVE EXAMPLE 1

Single tantalum capacitors were formed from tantalum powder having a specific charge of 150,000 µF*V/g (available from H.C. Starck). The tantalum powder was pressed using known techniques so that the resulting pellet had a length of about 5.00 millimeters, a width of 3.7 millimeters, and a thickness of 1.95 millimeters. The pellet was sintered at 1245° C. for 10 minutes. The pellet was anodized at a voltage of 15 volts, impregnated with manganese dioxide, and then coated with graphite and silver layers in the manner described above. The resulting tantalum parts had a capacitance of about 1000 µF. The capacitor was terminated using conventional techniques and encapsulated in a case having a length of about 7.5 mm, a width of about 4.5 mm, and a height of about 3.1 mm ("D" case, AVX Corp.). Various electrical properties of 10 to 50 samples of Example 1 and Comparative Example 1 were tested. The results are set forth below in Table 1.

TABLE 1

Comparison of Electrical Properties
(Average of Measured Values)

| Parameter | Comparative Example 1 | Example 1 |
| --- | --- | --- |
| Capacitance (µF) | 893.00 | 1070.00 |
| Wet to Dry Capacitance (%) | 42.70 | 10.30 |
| Dissipation Factor (%) | 54.60 | 19.30 |
| ESR (mΩ) | 78.00 | 32.00 |
| DCL (µA) | 11.38 | 7.45 |
| Breakdown Voltage (V) | 11.80 | 14.10 |
| Surge Failure Probability (%) | 0.70 | 0.05 |
| Peak Surge Current (A) | 11.60 | 14.00 |
| Max. Ripple Current (A) | 2.00 | 3.50 |

As indicated, the capacitor assembly of the present invention exhibited superior electrical properties to the comparative sample.

EXAMPLE 2

Capacitor assemblies were constructed from two niobium oxide ("NbO") capacitor elements as described above and shown in FIGS. 1-8. The niobium oxide powder used to form the capacitor elements had a specific charge of 80,000 µF*V/g (available from H.C. Starck). The niobium oxide powder was pressed using known techniques so that the resulting pellets had a length of about 5.35 millimeters, a width of 3.7 millimeters, and a thickness of 0.75 millimeters. The pellets were sintered at 1380° C. for 10 minutes. The pellets were anodized at a voltage of 27 volts, impregnated with manganese dioxide, and then coated with graphite and silver layers in the manner described above. Each individual niobium oxide part had a capacitance of about 110 µF. The parts were then connected in parallel to common anode and cathode terminations as described above so that the final capacitance of the assembly was about 220 µF and the rated voltage was 4 Volts. The capacitor assemblies were encapsulated in a case having a length of about 7.5 mm, a width of about 4.5 mm, and a height of about 3.1 mm ("D" case, AVX Corp.).

EXAMPLE 3

Capacitor assemblies were constructed as described in Example 2, except that the anode was fluted and a forming voltage of 21 volts was employed. The fluted anode had two parallel grooves extending on each side along the entire anode length (-x direction). Each groove had a width of 0.4 millimeters and a thickness of 0.25 millimeters. The fluted anode has a length of 5.35 millimeters, a width of 3.7 millimeters, and a thickness of 0.76 millimeters.

COMPARATIVE EXAMPLE 2

Single niobium oxide capacitors were formed from niobium oxide powder having a specific charge of 80,000 µF*V/g (available from H.C. Starck). The niobium oxide powder was pressed using known techniques so that the resulting pellets had a length of about 4.10 millimeters, a width of 3.7 millimeters, and a thickness of 1.95 millimeters. The pellet was sintered at 1380° C. for 10 minutes. The pellet was anodized at a voltage of 27 volts, impregnated with manganese dioxide, and then coated with graphite and silver layers in the manner described above. The resulting parts had a capacitance of about 220 µF. The capacitor was terminated using conventional techniques and encapsulated in a case having a length of about 7.5 mm, a width of about 4.5 mm, and a height of about 3.1 mm ("D" case, AVX Corp.).

COMPARATIVE EXAMPLE 3

Single niobium oxide capacitors were formed as described in Comparative Example 2, except that the anode was fluted and anodized at a voltage of 27 Volts. The fluted anode had two parallel grooves on each side extending along the entire anode length (-x direction). The corners of the anode were rounded. Each groove had a width of 0.4 millimeters and a thickness of 0.25 millimeters. The fluted anode has a length of 4.90 millimeters, a width of 3.6 millimeters, and a thickness of 1.95 millimeters. Various electrical properties of 10 to 50 samples of Example 2 and 3, as well as Comparative Examples 2 and 3, were tested. The results are set forth below in Table 2.

TABLE 2

Comparison of Electrical Properties
(Average of Measured Values)

| Parameter | Comparative Example 2 | Comparative Example 3 | Example 2 | Example 3 |
|---|---|---|---|---|
| Capacitance (µF) | 211.00 | 219.00 | 229.00 | 225.00 |
| Wet to Dry Capacitance (%) | −14.00 | −12.40 | −9.80 | −8.00 |
| Dissipation Factor (%) | 3.50 | 2.30 | 1.60 | 1.70 |
| ESR (mΩ) | 82.00 | 48.00 | 31.00 | 29.00 |
| DCL (µA) | 0.87 | 0.67 | 0.84 | 1.36 |
| Breakdown Voltage (V) | 12.10 | 12.80 | 13.70 | 13.90 |
| Surge Failure Probability (%) | 0.70 | 0.40 | 0.03 | 0.02 |
| Peak Surge Current (A) | 12.00 | 14.00 | 14.50 | 14.80 |
| Max. Ripple Current (A) | 1.50 | 2.80 | 3.40 | 3.60 |

As indicated, the capacitor assemblies of the present invention exhibited superior electrical properties to the comparative samples.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
    a first solid electrolytic capacitor element;
    a second solid electrolytic capacitor element positioned adjacent to the first solid electrolytic capacitor element, wherein the first and second solid electrolytic capacitor elements each contain an anode formed from a valve metal composition having a specific charge of about 70,000 µF*V/g or more, the anode having a thickness of from about 0.1 to about 4 millimeters;
    a thermally conductive material positioned between the first and second solid electrolytic capacitor elements and electrically connected thereto, wherein the thermally conductive material has a coefficient of thermal conductivity of about 100 W/m-K or more at a temperature of 20° C.;
    an anode termination to which first and second anode leads of the first and second solid electrolytic capacitor elements, respectively, are electrically connected, wherein the anode termination contains a portion having an upper region and a lower region, the upper region being electrically connected to the first anode lead and the lower region being electrically connected to the second anode lead, the portion containing two or more arcuate surfaces between which an opening is defined;
    a cathode termination to which cathodes of the first and second solid electrolytic capacitor elements are electrically connected; and
    a case that encapsulates the first and second solid electrolytic capacitor elements, wherein the case leaves exposed portions of the anode and cathode terminations.

2. The capacitor assembly of claim 1, wherein the valve metal composition has a specific charge of about 80,000 µF*V/g or more.

3. The capacitor assembly of claim 1, wherein the valve metal composition has a specific charge of about 120,000 µF*V/g or more.

4. The capacitor assembly of claim 1, wherein the valve metal composition includes tantalum.

5. The capacitor assembly of claim 1, wherein the valve metal composition includes niobium oxide.

6. The capacitor assembly of claim 1, wherein the first and second solid electrolytic capacitor elements contain a dielectric film overlying the anode and a solid electrolyte overlying the dielectric film.

7. The capacitor assembly of claim 1, wherein the anode has a thickness of from about 0.2 to about 3 millimeters.

8. The capacitor assembly of claim 1, wherein the anode has a thickness of from about 0.4 to about 1 millimeter.

9. The capacitor assembly of claim 1, wherein the thermally conductive material has a coefficient of thermal conductivity of from about 200 to about 400 W/m-K at a temperature of 20° C.

10. The capacitor assembly of claim 1, wherein the thermally conductive material is formed from a metal selected from the group consisting of copper, nickel, silver, nickel, zinc, tin, palladium, lead, copper, aluminum, molybdenum, titanium, iron, zirconium, magnesium, and alloys thereof.

11. The capacitor assembly of claim 10, wherein the metal is copper or a copper alloy.

12. The capacitor assembly of claim 1, wherein the thermally conductive material has a thickness of from about 0.01 to about 1 millimeter.

13. The capacitor assembly of claim 1, wherein the thermally conductive material has a thickness of from about 0.1 to about 0.2 millimeter.

14. The capacitor assembly of claim 1, wherein the first and second solid electrolytic capacitor elements are stacked in a horizontal configuration.

15. The capacitor assembly of claim 1, wherein the thermally conductive material is electrically connected to the first and second solid electrolytic capacitor elements with a conductive adhesive.

16. The capacitor assembly of claim 1, wherein the thermally conductive material is formed by the cathode termination.

17. capacitor assembly of claim 1, wherein the upper region, the lower region, or both have a U-shape.

18. The capacitor assembly of claim 1, wherein the first anode lead is substantially parallel to and in substantial horizontal alignment with the second anode lead.

19. The capacitor assembly of claim 1, wherein the portion of the anode termination is positioned substantially perpendicular to a bottom surface of the capacitor assembly.

20. The capacitor assembly of claim 1, further comprising an additional solid electrolytic capacitor element positioned adjacent to the first solid electrolytic capacitor element.

21. The capacitor assembly of claim 1, wherein the assembly has a peak surge current of about 12.0 Amps or more.

22. The capacitor assembly of claim 1, wherein the assembly has a peak surge current of from about 14.0 Amps to about 30.0 Amps.

23. The capacitor assembly of claim 1, wherein the assembly has a maximum ripple current of about 2.5 Amps or more.

24. The capacitor assembly of claim 1, wherein the assembly has a maximum ripple current of about 3.5 Amps or more.

25. The capacitor assembly of claim 1, wherein the portion of the anode termination defines an upper arcuate surface and a lower arcuate surface.

26. The capacitor assembly of claim 25, wherein the upper arcuate surface and the lower arcuate surface are positioned adjacent to the upper region and the lower region, respectively.

27. The capacitor assembly of claim 26, wherein a portion of the anode termination contains two additional opposing arcuate surfaces positioned substantially perpendicular to the upper arcuate surface and the lower arcuate surface.

28. A capacitor assembly comprising:
a first solid electrolytic capacitor element;
a second solid electrolytic capacitor element positioned adjacent to the first solid electrolytic capacitor element, wherein the first and second solid electrolytic capacitor elements each contain an anode formed from a valve metal composition, the anode having a thickness of from about 0.1 to about 4 millimeters, further wherein the first solid electrolytic capacitor element has a first anode lead and the second solid electrolytic capacitor element has a second anode lead, wherein the first anode lead is substantially parallel to and in substantial horizontal alignment with the second anode lead;
an anode termination containing a portion having an upper region and a lower region, the upper region being electrically connected to the first anode lead and the lower region being electrically connected to the second anode lead, wherein the portion contains two or more arcuate surfaces between which an opening is defined;
a cathode termination positioned between the first and second solid electrolytic capacitor elements and electrically connected thereto, wherein the cathode termination contains a thermally conductive material; and
a case that encapsulates the first and second solid electrolytic capacitor elements, wherein the case leaves exposed portions of the anode and cathode terminations.

29. The capacitor assembly of claim 28, wherein the valve metal composition has a specific charge of about 70,000 μF*V/g or more.

30. The capacitor assembly of claim 28, wherein the valve metal composition has a specific charge of about 120,000 μF*V/g or more.

31. The capacitor assembly of claim 28, wherein the valve metal composition includes tantalum or niobium oxide.

32. The capacitor assembly of claim 28, wherein the anode has a thickness of from about 0.4 to about 1 millimeter.

33. The capacitor assembly of claim 28, wherein the thermally conductive material has a coefficient of thermal conductivity of 100 W/m-K or more at a temperature of 20° C.

34. The capacitor assembly of claim 28, wherein the thermally conductive material is copper or a copper alloy.

35. The capacitor assembly of claim 28, wherein the first and second solid electrolytic capacitor elements are stacked in a horizontal configuration.

36. The capacitor assembly of claim 28, wherein the upper region, the lower region, or both have a U-shape.

37. The capacitor assembly of claim 28, wherein the portion of the anode termination is positioned substantially perpendicular to a bottom surface of the capacitor assembly.

38. The capacitor assembly of claim 28, wherein the portion of the anode termination defines an upper arcuate surface and a lower arcuate surface.

39. The capacitor assembly of claim 38, wherein the upper arcuate surface and the lower arcuate surface are positioned adjacent to the upper region and the lower region, respectively.

40. The capacitor assembly of claim 39, wherein a portion of the anode termination contains two additional opposing arcuate surfaces positioned substantially perpendicular to the upper arcuate surface and the lower arcuate surface.

* * * * *

UNITED STATES PATENT AND TRADEMARK OFFICE
CERTIFICATE OF CORRECTION

PATENT NO.         : 7,468,882 B2
APPLICATION NO.    : 11/602451
DATED              : December 23, 2008
INVENTOR(S)        : Ladislav Marek, Jaroslav Tomasko and Stanislav Zednicek It is certified that error appears in the above-identified patent and that said Letters Patent is hereby corrected as shown below:

Col. 15 lines 17-18 Claim 17 "capacitor assembly of claim 1..." should read --The capacitor assembly of claim 1...--

Signed and Sealed this

Tenth Day of March, 2009

JOHN DOLL
*Acting Director of the United States Patent and Trademark Office*